United States Patent
Nguyen et al.

(10) Patent No.: US 9,716,618 B2
(45) Date of Patent: Jul. 25, 2017

(54) SCRIPT TERMINATION

(71) Applicant: International Business Machines Corporation, Armonk, NY (US)

(72) Inventors: Hoang-Nam Nguyen, Boeblingen (DE); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 14/258,075

(22) Filed: Apr. 22, 2014

(65) Prior Publication Data

US 2015/0304161 A1 Oct. 22, 2015

(51) Int. Cl.
*G06F 15/177* (2006.01)
*H04L 12/24* (2006.01)

(52) U.S. Cl.
CPC ...... *H04L 41/0803* (2013.01); *H04L 41/0856* (2013.01)

(58) Field of Classification Search
CPC ............. H04L 41/0803; H04L 41/0856; G06F 12/1027; G06F 12/1072; G06F 3/0688; G06F 3/0611; G06F 3/0607; G06F 3/0619; G06F 3/0622; G06F 3/0689
USPC ......... 709/220; 711/144, 112, 170, 103, 165
See application file for complete search history.

(56) References Cited

U.S. PATENT DOCUMENTS

| | | | |
|---|---|---|---|
| 8,521,808 B2 | 8/2013 | Bristow et al. | |
| 2003/0131146 A1* | 7/2003 | Lam | G06F 9/45512 719/320 |
| 2006/0282638 A1* | 12/2006 | Oshima | G06F 3/0622 711/170 |
| 2007/0198665 A1* | 8/2007 | De Matteis | H04L 41/0843 709/220 |
| 2008/0294814 A1* | 11/2008 | Gorobets | G11C 16/349 710/62 |
| 2009/0279673 A1* | 11/2009 | Maffre | H04L 12/2697 379/1.03 |
| 2009/0307379 A1 | 12/2009 | Mohl | |
| 2012/0166774 A1* | 6/2012 | Tsuji | G06F 11/2236 712/227 |
| 2012/0243559 A1* | 9/2012 | Pan | H04J 3/1605 370/503 |
| 2012/0291028 A1 | 11/2012 | Kidambi et al. | |

(Continued)

OTHER PUBLICATIONS

IBM, "IBM System Networking RackSwitch™ G8264 Application Guide for Networking OS 7.8", First Edition (Dec. 2013), pp. 1-602, © Copyright IBM Corporation 2013. Grace Period Disclosure.

(Continued)

*Primary Examiner* — Thuong Nguyen
(74) *Attorney, Agent, or Firm* — Zilka-Kotab, P.C.

(57) ABSTRACT

A scheduler may run a script. The script may have a plurality of configuration commands for a network device. A first configuration command of the plurality of configuration commands may be called to begin. A script engine may determine whether a termination request has been received. The script engine may run the first configuration command when it is determined the termination request is not received. While the first configuration command is running, the script engine may receive the termination request. Instead of terminating immediately upon detection of a termination request, the first configuration command may complete.

17 Claims, 4 Drawing Sheets

(56) References Cited

U.S. PATENT DOCUMENTS

2013/0097400 A1* 4/2013 Shitomi ................ G06F 3/0604
 711/165
2013/0286833 A1* 10/2013 Torres .................... H04L 69/24
 370/235

OTHER PUBLICATIONS

IBM, "IBM Networking OS Python Programming Guide for the RackSwitch G8264", First Edition (Dec. 2013), © Copyright IBM Corporation 2013. Grace Period Disclosure.

IBM, "Features List", IBM RackSwitch G8264 Version 7.8.1.0, Released Dec. 2013. Grace Period Disclosure. http://download2.boulder.ibm.com/sar/CMA/SNA/046tv/1/G8264_7.8.1_change_history.txt.

* cited by examiner

Script S1 410 cli("vlan 1002");

cli("enable");

cli("exit");

cli("interface eth0");

cli("switch trunk port add 1002");

cli("exit");

FIG. 4

SCRIPT TERMINATION

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S): [Incorporated in a product release in December 2013 of IBM Switch G8264 and Networking Operating System. Documents supporting product release "Features List", Released Dec. 1, 2013, found at: http://download2.boulder.ibm.com/sar/CMA/SNA/046tv/1/G8264_7.8.1_change_history.txt; "IBM System Networking RackSwitch™ G8264 Application Guide for Networking OS 7.8, Released Dec. 1, 2013, found at: http://www-01.ibm.com/support/docview.wss?uid=isg3T7000650&aid=1; and "IBM Networking OS Python Programming Guide for the RackSwitch G8264" Released Dec. 1, 2013, found at: http://www-01.ibm.com/support/docview.wss?uid=isg3T7000658&aid=1].

BACKGROUND

The present disclosure relates to network devices, and more specifically, to script termination on a network device.

Computer networks have a variety of network devices that are all interconnected. Some network devices include clients, servers, routers, hubs, and switches. Some network devices may be implemented as virtual machines, such as virtual switches. Network switches may allow for direct sending of a message from one network device to another through its ports rather than broadcasting the message to all devices connected to the network switch. Scripts with configuration commands can be ran on the network switches and other network devices to configure the flow of messages.

SUMMARY

According to embodiments of the present disclosure a method of intelligently terminating a script running on a network device, a network device performing the method and a computer program product of the method is described. A scheduler may run a script. The script may have a plurality of configuration commands for a network device. A first configuration command of the plurality of configuration commands may be called to begin. A script engine may determine whether a termination request has been received. The script engine may run the first configuration command when it is determined the termination request is not received. While the first configuration command is running, the script engine may receive the termination request. Instead of terminating immediately upon detection of a termination request, the first configuration command may complete.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to network devices, and more specifically, to script termination on network devices. Various embodiments herein provide for a method, computer program product, and network device that performs the method of script termination on a network device. The script may intelligently terminate upon an event of a termination request. When running a configuration command of the script and a termination request is received, the script may finish completing the configuration command before terminating the script. In other embodiments, the script may terminate before a configuration command has begun. In yet other embodiments, the script may be terminated forcibly by a scheduler when a termination criteria is met and a non-configuration command is being executed. Once the script is terminated, configuration commands that have completed may remain implemented on the network device even though the configuration commands of the entire script have not been performed.

On-box-scripting allows users to schedule a script, such as a Python script, to be executed on a network device such as a network switch. A script may run a sequence of command line interface (CLI) commands. Some of the script CLI commands may be configuration commands. The configuration commands, provided by a user of a management console, may be required in order to configure network device resources such as interfaces or virtual local area networks (VLANs). There are many conditions that may require the script to terminate intelligently, which may mean that the script will not immediately terminate when a termination request is received. An example of a condition may be CPU usage overload by the script. Intelligent termination may allow a configuration command of the script to complete to assure consistency of the running configuration.

As an example, the following may refer to a network switch as the network device on which the method of intelligent script termination may be performed. However, other network devices may be contemplated having a configuration script that executes configuration commands where there is a desire that a pending configuration command not be interrupted. Other examples of configuration operations in which the intelligent script termination is performed may be in a cloud environment with virtual machine configuration commands and application configuration commands in a virtual machine.

Figure 1:
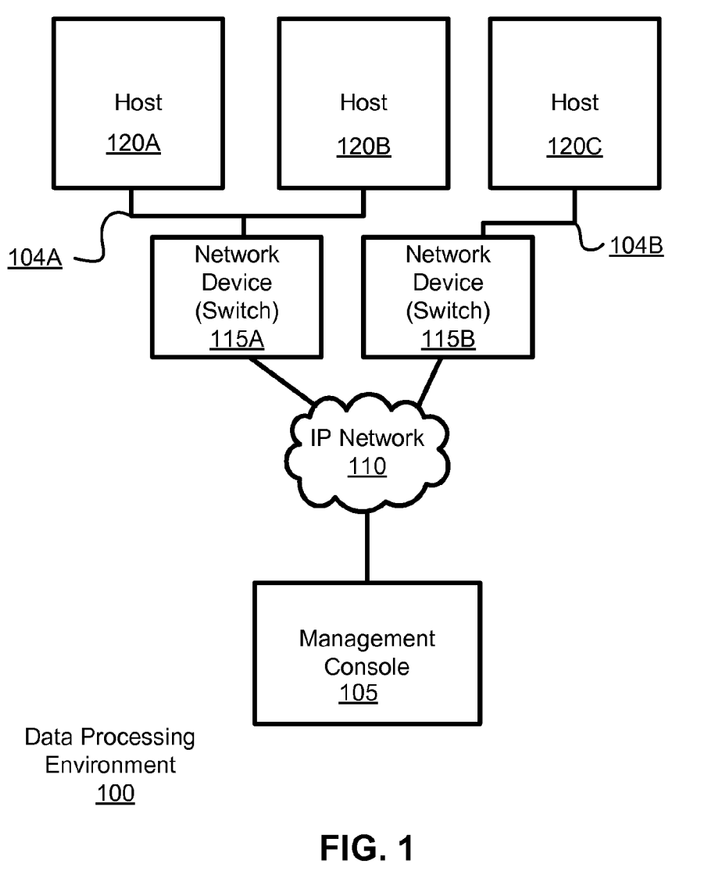
FIG. 1 illustrates a high level block diagram of a relevant portion of a data processing environment, according to various embodiments.

FIG. 1 illustrates a high level block diagram of a relevant portion of a data processing environment 100 that includes network devices that run scripts having configuration commands, according to various embodiments. The data processing environment 100 may include a management console 105 that is communicatively coupled to a network 110 including a plurality of network segments 104A, 104B, each of which is communicatively coupled to a respective one of physical or virtual network devices 115A and 115B. The network devices 115A and 115B may be network switches. Other network devices may be contemplated besides network switches such as, but not limited to, hubs, routers, virtual switches, and other devices that perform configuration scripts. Each of network switches may include a data structure (e.g., a forwarding table) by which network switches forward incoming data packets toward the packets' destinations based upon, for example, open system interconnection (OSI) layer 2 (e.g., media access control (MAC)) addresses contained in the packets. Hosts 120A, 120B may be communicatively coupled to network segment 104A and physical host 120C may be communicatively coupled to network segment 104B.

Each network device 115A and 115B (referred collectively or generally herein as network device 115) may have one or more scripts that may run on a processor as a sequence of command line interface (CLI) commands provided by a scripting application program interface (API) from the management console 105. These scripts may be used in order to configure the network device resources such as interfaces and VLANs. Each script may include configuration commands and non-configuration commands. There are many conditions (e.g., CPU usage overload by the script) that it can be desirable for a scheduler of the network device 115 to terminate a running script. Certain configuration commands of the script, if not completed when started, may cause corrupted configuration of the network device 115. Also, keeping status information regarding previously ran and completed configuration commands of the network device 115 may be desirable even if the processor has not finished running all of the configuration commands of the script. Terminating the script at a desired moment may provide consistency of the running configuration of the network device 115 such as network switches. The desired moment may be when no script configuration commands are being performed. For example, while a first configuration command is being run a script termination request may be received. Instead of terminating the script upon receiving the request, the first configuration command may complete and the script may terminate before a second termination command begins.

Figure 2:
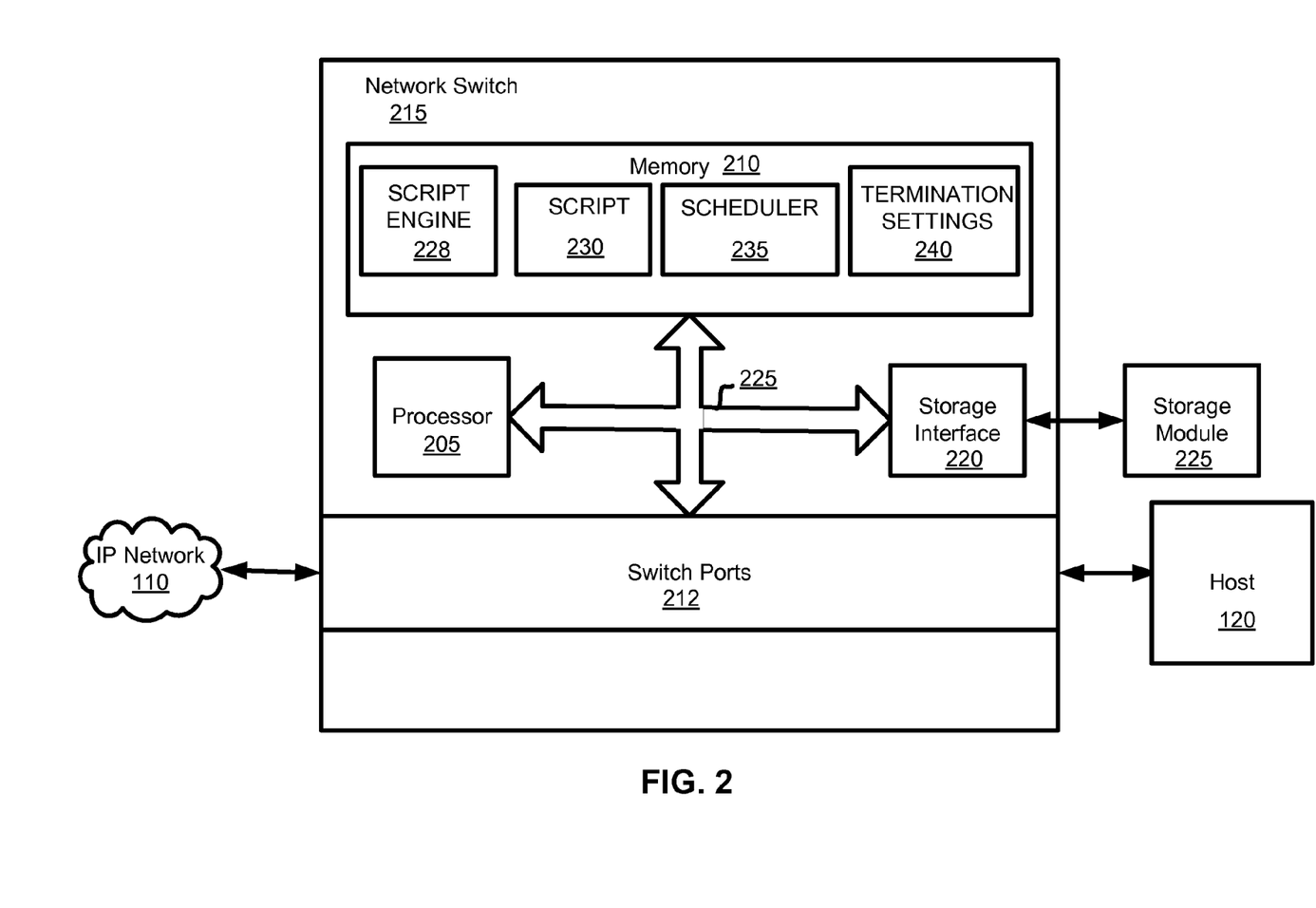
FIG. 2 is a schematic block diagram illustrating various embodiments of a network device.

FIG. 2 is a schematic block diagram illustrating various embodiments of a network switch 215 which may be illustrative of the major components of the network device 115 of FIG. 1. The network switch 215 is one example context in which embodiments may be implemented. The mechanisms and apparatus of the various embodiments disclosed herein apply equally to any appropriate computing system. The major components of the network switch 215 include one or more processors 205, a memory 210, a plurality of switch ports 215, and a storage interface 220 all of which are communicatively coupled, directly or indirectly, for inter-component communication via a bus 225.

The network switch 215 may contain one or more general-purpose programmable central processing units (CPUs) herein generically referred to as the processor 205. In an embodiment, the network switch 215 may contain multiple processors; however, in another embodiment, the network switch 215 may alternatively be a single CPU system. Each processor 205 may execute instructions stored in the memory 210 and may include one or more levels of on-board cache.

In an embodiment, the memory 210 may include a random-access semiconductor memory, storage device, or storage medium (either volatile or non-volatile) for storing or encoding data and programs. In another embodiment, the memory 210 represents the entire virtual memory of the network switch 215, and may also include the virtual memory of other computer systems coupled to the network switch 215 or connected via a network 110. The memory 210 is conceptually a single monolithic entity, but in other embodiments the memory 210 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 210 may store all or a portion of the following: a script engine 228, a script 230, scheduler 235, and termination settings 240. These programs and data structures are illustrated as being included within the memory 210 in the network switch 215, however, in other embodiments, some or all of them may be on different computer systems and may be accessed remotely, e.g., via a network 110. The network switch 215 may use virtual addressing mechanisms that allow the programs of the network switch 215 to behave as if they only have access to a large, single storage entity instead of access to multiple, smaller storage entities. Thus, while the script engine 228, the script 230, scheduler 235, and termination settings 240 are illustrated as being included within the memory 210, it may not necessarily all be completely contained in the same storage device at the same time.

In an embodiment, the script engine 228, the script 230, scheduler 235, and termination settings 240 may include instructions or statements that execute on the processor 205 or instructions or statements that are interpreted by instructions or statements that execute on the processor 205 to carry out the functions as further described below. In another embodiment, the script engine 228, the script 230, scheduler 235, and termination settings 240 may be implemented in hardware via semiconductor devices, chips, logical gates, circuits, circuit cards, and/or other physical hardware devices in lieu of, or in addition to, a processor-based system. In an embodiment, the script engine 228, the script 230, scheduler 235, and termination settings 240 may include data in addition to instructions or statements.

The storage interface 220 supports the attachment of one or more storage drives or direct access storage devices, such as storage module 225 (which may be rotating magnetic disk drive storage devices, although they could alternatively be other storage devices, including arrays of disk drives configured to appear as a single large storage device to a host computer, or solid-state drives, such as flash memory). In another embodiment, the storage module 225 may be implemented via any type of secondary storage device. The contents of the memory 210, or any portion thereof, may be stored to and retrieved from the storage module 225 as needed.

Switch ports 212 may provide one or more communication paths from the network switch 215 to other digital devices and computer systems; these communication paths may include, e.g., one or more networks 110. The switch ports 212 may provide a direct communication pathway when the network device is a switch from one computer system, such as host 120 to another computer system. A switch table may be configured by scripts to direct the traffic of packets from the one computer system to the other computer system.

In various embodiments of the network device 215 of FIG. 2, the script engine 228 and scheduler 235 may perform an intelligent termination of the script 230 when a criteria of the termination settings 240 is met. Particularly, the configuration commands of the script 230 may be terminated intelligently when a criteria of the termination settings 240 is met. Either the scheduler 235 may terminate the script 230 or the script engine 228 may be configured to terminate the script 230.

FIG. 2 is intended to depict the representative major components of the network switch 215 a representative network device, according to various embodiments. Individual components, however, may have greater complexity than represented in FIG. 2 components other than or in addition to those shown in FIG. 2 may be present, and the number, type, and configuration of such components may vary. Several particular examples of additional complexity or additional variations are disclosed herein; these are by way of example only and are not necessarily the only such variations. The various program components illustrated in FIG. 2 may be implemented, in various embodiments, in a number of different manners, including using various computer applications, routines, components, programs, objects, modules, data structures, etc., which may be referred to herein as "software," "computer programs," or simply "programs."

Figure 3:
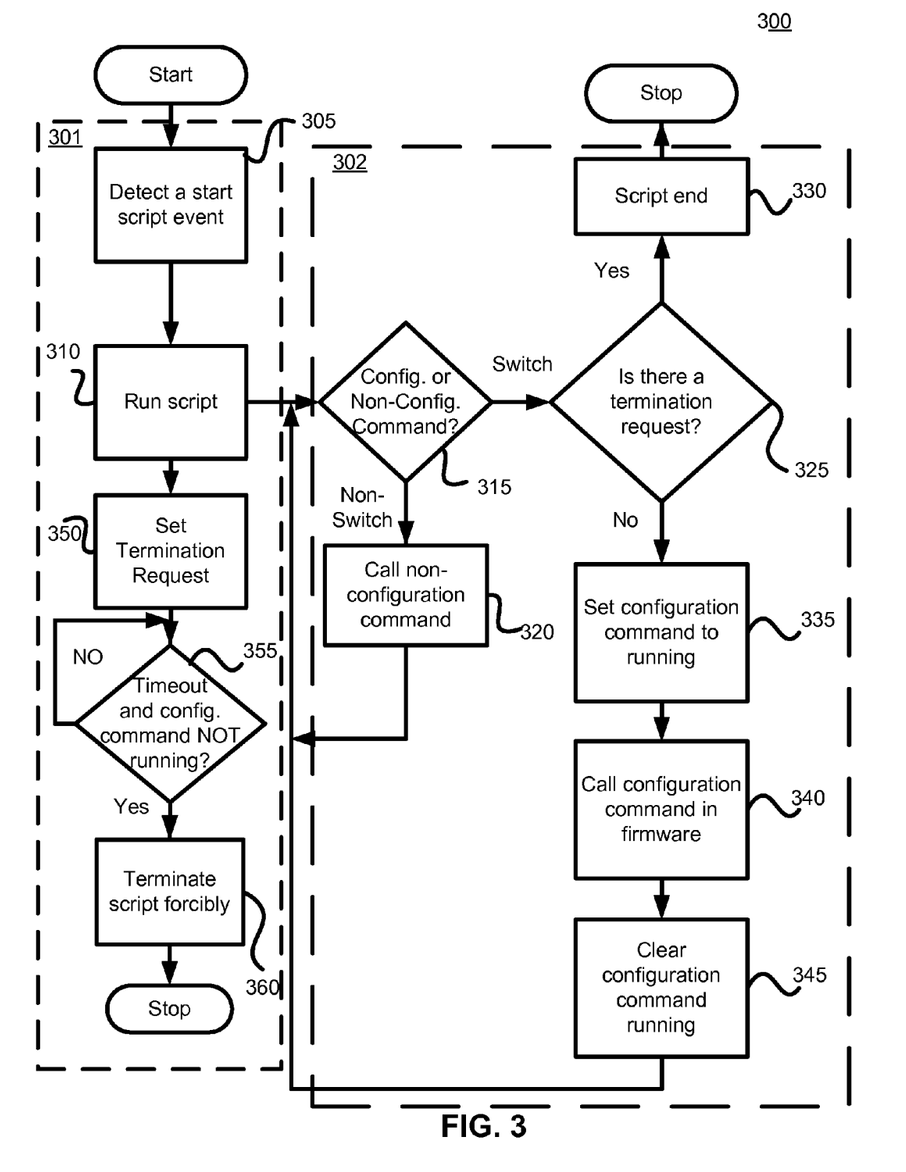
FIG. 3 is a flow chart of a method of terminating a script intelligently on the network device, according to various embodiments.

FIG. 3 illustrates a flowchart of a method 300 of intelligent script termination, according to various embodiments. In various embodiments, the method 300 may be performed in part by the scheduler 235 and in part by the script engine 228 of FIG. 2. In summary, the method 300 may run a script 230 with the script engine 228. The script engine 228 may call a configuration command from the script 230. The script engine 228 may determine whether any termination requests are present from the scheduler 235 and any other source that may send a termination request. If there is not a termination request the configuration command may begin running. While the configuration command is running on the processor, a termination request may be received or flagged by the scheduler 235. The configuration command may complete running and the script engine may terminate the script before another configuration command can begin to run.

The portion of the method 300 performed by the scheduler 235 may be represented in box 301 and the portion of the method 300 performed by the script engine 228 may be represented in box 302. The script 230 and the scheduler 235 may be running concurrently on the processor of the network device. The method 300 may begin at operation 305. In operation 305, the scheduler 235 may detect a start script event. The start script event may be manual execution of the script by the management console 105 of FIG. 1 via CLI. In various embodiments, the start script event may be initiated by the scheduler 235 when a certain event such by a port link down event or by a periodic timer (e.g., start script at midnight).

In operation 310, the scheduler 235 may initiate the script 230. At operation 310, the method 300 may diverge where the script engine 228 and script 230 are running as separate processes from the scheduler 235. The scheduler 235 may run on the processor according to the operations of the first box 301 while the script engine and script 230 may run on the processor according to the operations of the second box 302. The scheduler 235, the script engine, and the script 230 may be running on the network device, such as network device 115 of FIG. 1, and use shared memory for inter-process communication. In operation 350, the scheduler 235 has termination settings 240 established that may forcibly terminate the script 230. The termination settings 240 may include a timer. For example, the termination settings 240 may be set to have the scheduler 235 terminate the script 230 when the script 230 is processing for 3 seconds without completing a scripting command. In operation 355, the scheduler 235 may monitor the network device to determine whether a termination request is received and the script command being performed is not a configuration command but a non-configuration command. If neither of the conditions are met, then the scheduler 235 continues to monitor the running script 230. If both conditions are met, then, in operation 360, the scheduler 235 may terminate the running script 230 forcibly and the method 300 may end. Terminating the script forcibly may mean that once a termination request is received and even though the script may be performing a command, the scheduler 235 may stop running of the script while the command is being performed.

Returning to the second box 302 of operations of the method 300, the script engine 228 and the script 230 may perform the operations in the box 302. The script engine 228 may execute and call a script 230. In operation 315, it may be determine whether the current command of the script 230 is a configuration command or a non-configuration command. The non-configuration command may be a scripting command that is not a configuration command. If the script command is a non-configuration command, then, in operation 320 the non-configuration command may be called and performed and the method 300 may return to operation 315. If the script command is a configuration command, then method 300 may continue with operation 325.

In operation 325, the script engine 228 may determine whether there is a termination request. A termination request may be a manual request to end a script 230 or a termination criteria configured by the termination settings 240 that may have occurred. If there is a termination request, then, in operation 330, the script engine 228 may end and the method 300 stop. If there is not a termination request in operation 325, then the method 300 may continue to operation 335. In operation 335, the configuration command may be set to running. In operation 340, the configuration command may be called in the firmware of the network device. In operation 345, the configuration command may finish and be cleared. The method 300 may return to operation 315. If a termination request occurred while operation 335-operation 345 were being performed, the script engine 228 would wait to terminate the script 230 not until after the configuration command is completed. When the script 230 is terminated, all previously completed network device functions may remain active to provide consistency of the running configuration.

Figure 4:
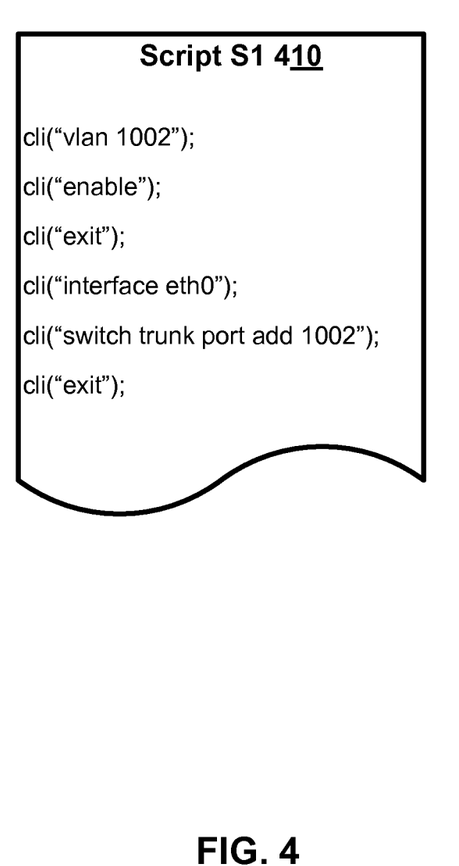
FIG. 4 illustrates an example script, according to various embodiments.

FIG. 4 illustrates an example script 410 that performs several configuration commands. The script 410 creates "vlan 1002" and assigns it to the interface "eth0." The pseudo code that follows illustrates how a CLI configuration command is implemented and executed by the script engine 228. The pseudo code illustrates an intelligent termination of the script.

```
01: def cli(command):
02:    if (test_terminate_request_and_set_config_cmd_running( )):
03:        sys.exit( ); // terminate requested, exit script
04:    telnet_session.send_cli_command(command);
05:    telnet_session.read_output( );
06:    clear_config_cmd_running( );
```

The scheduler 235 of FIG. 2 and a running script 410 are separate processes running on the network device and use shared memory for inter-process-communication with the following data structure:

```
struct script_control {
    semaphore_t sema;
    boolean terminate_requested; /* initially set to false,
ie no termination request */
    boolean config_cmd_running;  /* initially set false, ie no
config command pending */
};
```

If there is a request for the scheduler 235 to terminate a running script 410 intelligently, the scheduler 235 may notify the script 410 to terminate by performing the following operations in the script's code:

```
lock(&shm->sema);
shm->terminate_requested = true;
unlock(&shm->sema);
```

The functions "test_terminate_request_and_set_config_cmd_running( )" and "clear_config_cmd_running( )" of the CLI( ) function above are functions that may be provided by the scheduler 235 to allow the scheduler 235 to terminate the script 410.

```
/* atomic operation:
 * if no terminate request, set config_cmd_running to true, ie a
   config cmd
 * is running
 * return terminate_requested flag
 */
boolean test_terminate_request_and_set_config_cmd_running( )
{
    boolean ret
    lock(&shm->sema);
    ret = shm->terminate_requested;
    if (!ret) // no terminate request
        shm->config_cmd_running = true;
    unlock(&shm->sema);
    return true;
}
/* atomic operation:
 * set config_cmd_running to false, ie no config cmd is pending
 */
void clear_config_cmd_running( )
{
    lock(&shm->sema);
    shm->config_cmd_running = false;
    unlock(&shm->sema);
}
```

Assuming there is a request for the script 410 to terminate, one of the following scenarios may occur during the script 410 execution. In a first scenario, the script 410 may not yet have started to perform its configuration command. The function cli( ) above will exit at line 03. In a second scenario, the script 410 may have already started to perform its configuration command, i.e., its execution is after line 03 of function cli( ). The script 410 will wait for the pending configuration command to complete. Thereafter, the script 410 will perform the next call to function cli( ) and terminate at line 03. In a third scenario, the script 410 may already be executing some other scripting command (not a configuration command), which can cause CPU usage overload or impact network device OS applications. In this case the config_cmd_running flag is false, and the scheduler 235 may terminate the script 410 forcibly after a configurable timeout, e.g., 3 seconds.

Referring back to the figures, embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of terminating a script, the method comprising:
   running a script, the script having a plurality of commands including a plurality of configuration commands and at least one non-configuration command for a network device;
   calling a first configuration command of the plurality of configuration commands of the script;
   determining whether a termination request has been received;
   running the first configuration command in response to a determination that the termination request has not been received prior to starting the running of the first configuration command;
   receiving the termination request after starting the running of the first configuration command;
   completing the running of the first configuration command without forcibly terminating the first configuration command in response to a determination that the termination request has not been received prior to starting the running of the first configuration command;
   terminating the script prior to running another command of the script in response to a determination that the termination request was received after starting the running of the first configuration command; and
   terminating the script forcibly by a scheduler in response to a determination that:
      the at least one non-configuration command of the script is being performed;
      the termination request is received during performance of the non-configuration command; and
      at least one of a plurality of termination criteria has been met for the non-configuration command, wherein the termination criteria are selected from a group comprising: processor overload due to execution of the script and a configurable time limit for execution of the script being exceeded.

2. The method of claim 1, further comprising:
   calling a second configuration command of the plurality of configuration commands of the script after the running of the first configuration command has completed; and
   terminating the script prior to running the second configuration command in response to a determination that the termination request was received prior to starting the running of the second configuration command, wherein all previously completed commands of the script remain implemented on the network device to provide consistency of a configuration of the network device.

3. The method of claim 1, further comprising:
saving changes to a configuration of the network device due to a successfully completed first configuration command in response to a determination that the script is terminated before all of the plurality of configuration commands have completed, wherein all previously completed commands of the script remain implemented on the network device to provide consistency of a configuration of the network device.

4. The method of claim 1, wherein the plurality of configuration commands comprise command line interface (CLI) commands that configure a resource of the network device selected from a group consisting of: an interface and a virtual local area network (VLAN).

5. The method of claim 1, further comprising:
detecting an event occurrence prior to running the script that signals a scheduler to run the script, wherein the running the script is started in response to detection of the event.

6. The method of claim 5, wherein the event is selected from a group consisting of: failure of a resource of the network device, manual execution of the script via a management console, and exhaustion of a periodic timer.

7. A network device, comprising:
a processor; and
a memory communicatively coupled to the processor, wherein the memory is encoded with program instructions, the program instructions being executable by the processor to cause the processor to:
run a script, the script having a plurality of configuration commands and at least one non-configuration command for the network device;
call a first configuration command of the plurality of configuration commands;
determine whether a termination request has been received;
run the first configuration command in response to a determination that the termination request was not received;
receive the termination request after beginning to run the first configuration command; and
complete the running of the first configuration command without forcibly terminating the first configuration command in response to a determination that the termination request was received after beginning to run the first configuration command;
terminate the script prior to running another command of the script in response to a determination that the termination request was received after starting the running of the first configuration command; and
terminate the script forcibly by a scheduler in response to a determination that:
the at least one non-configuration command of the script is being performed;
the termination request is received during performance of the non-configuration command; and
at least one of a plurality of termination criteria has been met for the non-configuration command, wherein the termination criteria are selected from a group comprising: processor overload due to execution of the script and a configurable time limit for execution of the script being exceeded.

8. The network device of claim 7, wherein the program instructions are further executable by the processor to cause the processor to:
call a second configuration command of the plurality of configuration commands of the script after the first configuration command has completed running; and
terminate the script prior to running the second configuration command in response to a determination that the termination request was received prior to starting the running of the second configuration command.

9. The network device of claim 7, wherein the program instructions are further executable by the processor to cause the processor to:
save changes to a configuration of the network device due to a successfully completed first configuration command in response to a determination that the script is terminated before all of the plurality of configuration commands have completed.

10. The network device of claim 7, wherein the plurality of configuration commands comprise command line interface (CLI) commands that configure a resource of the network device selected from a group consisting of: an interface and a virtual local area network (VLAN).

11. The network device of claim 7, wherein the program instructions are further executable by the processor to cause the processor to:
detect an event occurrence prior to running the script that signals a scheduler to run the script, wherein the script is run in response to detection of the event.

12. The network device of claim 11, wherein the event is selected from a group consisting of: failure of a resource of the network device, manual execution of the script via a management console, and exhaustion of a periodic timer.

13. A computer program product for terminating a script, the computer program product comprising a computer readable storage device having program code embodied therewith, the embodied program code executable by a computer system to cause the computer system to:
run a script, by the computer system, the script having a plurality of configuration commands and at least one non-configuration command for a network device;
call, by the computer system, a first configuration command of the plurality of configuration commands of the script;
determine, by the computer system, whether a termination request has been received;
run, by the computer system, the first configuration command in response to a determination that the termination request has not been received prior to starting to run the first configuration command;
receive, by the computer system, the termination request after starting to run the first configuration command;
complete, by the computer system, the running of the first configuration command without forcibly terminating the first configuration command and terminate the script prior to running another command of the script in response to a determination that the termination request was received after starting to run the first configuration command;
terminate, by the computer system, the script prior to running another command of the script in response to a determination that the termination request was received after starting the running of the first configuration command; and
terminate, by the computer system, the script forcibly by a scheduler in response to a determination that:

the at least one non-configuration command of the script is being performed;

the termination request is received during performance of the non-configuration command; and at least one of a plurality of termination criteria has been met for the non-configuration command, wherein the termination criteria are selected from a group comprising: processor overload due to execution of the script and a configurable time limit for execution of the script being exceeded.

14. The computer program product of claim 13, wherein the embodied program code executable by the computer system further causes the computer system to:

call a second configuration command of the plurality of configuration commands of the script after the first configuration command has completed running; and terminate the script prior to running the second configuration command in response to a determination that the termination request was received prior to starting the running of the second configuration command.

15. The computer program product of claim 13, wherein the embodied program code executable by the computer system further causes the computer system to:

save changes to a configuration of the network device due to a successfully completed first configuration command in response to a determination that the script is terminated before all of the plurality of configuration commands have completed.

16. The computer program product of claim 13, wherein the plurality of configuration commands comprise command line interface (CLI) commands that configure a resource of the network device selected from a group consisting of: an interface and a virtual local area network (VLAN).

17. The computer program product of claim 13, wherein the embodied program code executable by the computer system further causes the computer system to:

detect an event occurrence prior to running the script that signals a scheduler to run the script, wherein the script is run in response to detection of the event, and wherein the event is selected from a group consisting of: failure of a resource of the network device, manual execution of the script via a management console, and exhaustion of a periodic timer.

* * * * *